Patented Apr. 5, 1932

1,852,259

UNITED STATES PATENT OFFICE

CLINTON HENRY PARSONS, OF CHICAGO, ILLINOIS, ASSIGNOR TO SWIFT & COMPANY, OF CHICAGO, ILLINOIS, A CORPORATION OF ILLINOIS

NEW FOOD PRODUCT

No Drawing.   Application filed April 20, 1928. Serial No. 271,649.

This invention relates to new food products and to a method of producing the same.

The new food products of the present invention are emulsified food products of a highly nutritious and appetizing character containing fried bacon incorporated therein. The improved process of the invention includes an emulsification process in which fried bacon is emulsified with cheese and with an emulsifying agent as well as an improved method in which fried bacon is emulsified with caramelized and hydrolyzed milk.

I have found that fried bacon when incorporated into cheese in the form of a homogeneous emulsified product makes a delicious and valuable spread for bread, having a distinct bacon flavor as well as a cheese flavor and base.

I have found that fried bacon can be readily incorporated with cheese to form a homogeneous and stable product by first incorporating fried bacon with specially processed milk to form a homogeneous emulsion and by then incorporating cheese with this emulsion. The resulting product consists of a homogeneous blend of cheese, specially processed milk and fried bacon. This product is so processed and proportioned as to give a highly nutritious, appetizing food product which has a pronounced appetite appeal and is valuable as a sandwich spread.

The new composite product has the important practical advantage that it contains a relatively high percentage of fats, proteins, carbohydrates and mineral substances.

The cheese base with which the fried bacon is incorporated to form the new emulsified product is made up of cheese and an emulsifying material. A valuable emulsifying material is made by subjecting concentrated milk to a caramelizing and hydrolyzing treatment. Such caramelized and hydrolyzed milk is valuable not only for aiding in incorporating the cheese and fried bacon with each other, but also because it imparts its individual flavor to the composition and improves the texture of the resulting product.

The emulsifying agent which I have found particularly valuable for the emulsification of fried bacon (including bacon fat) with cheese, and also for forming a new emulsified product with the fried bacon without admixture of cheese, is made by subjecting milk to a caramelizing and hydrolyzing treatment to caramelize milk sugar and hydrolyze proteins so as to form a large percentage of protein hydrate in the product. This caramelized and hydrolyzed milk has valuable emulsifying properties which enable fried bacon to be incorporated therewith to form an emulsified product and also enables fried bacon and cheese to be converted into a homogeneous emulsified product.

The cheese employed in making the new food product is preferably a blend of American cheese of different ages, blended so as to produce a moderately nippy uniform product. The cheese mixture may consist, for example, of a blend of cheese having ages of about two months, six months and one year or in other proportions to give a moderately nippy flavor. In the case of the year old cheese equal parts of New York and Wisconsin cheese may be employed. American cheese or cheese of the Cheddar class can be thus mixed together to form the cheese blend used for incorporation with the fried bacon in making the new food product. The cheese can be ground or comminuted to facilitate its incorporation with the other ingredients.

The fried bacon employed is made by frying sliced bacon, for example, by immersing it in a vat of hot bacon grease and keeping it in continuous motion in the hot grease until it becomes fairly crisp and takes on a light brownish color when it is removed. Care should be taken that the bacon is not fried too crisp, otherwise the lean portion will become too dark in color, which will impart an undesirable appearance to the product and the burnt flavor of overcooked bacon. When properly fried the yield of fat is about two to three parts of fat to one part of fried bacon.

The emulsifying agent employed for emulsifying the bacon and incorporating it with the cheese is advantageously a caramelized and hydrolyzed milk product. This milk emulsifier may be made in accordance with the following specific example:

Powdered milk, either whole milk or skim milk, is mixed with water in the proportion of about three parts of milk powder to one part of water and about two to four per cent of an emulsifying salt is added, using, for example, an alkali base salt or citric or tartaric acid as emulsifying salt. The mixture is then transferred to a kettle equipped with a special agitator and steam jacketed and so arranged as to permit live steam to be directly injected into the kettle. The agitator is set in motion and live steam injected directly into the product in the kettle and the temperature is raised quickly to about 90 to 95° C. and the live steam is then turned off and the temperature maintained by means of the steam jacket with moderate agitation for a period of about twenty minutes to one hour.

As the result of this treatment the milk will have taken on a brownish yellow color and will have an aroma resembling that of highly roasted beef. The time of heating for the production of the product can be materially shortened and the product somewhat improved if the treatment is carried out in a closed vessel equipped with an agitator and heated to a somewhat higher temperature at a pressure of about fifteen pounds.

To the product thus produced calcium lactate is added either in the form of a hot concentrated solution or in the form of finely ground powder. The mass then assumes a somewhat grainy appearance and the material thickens. Agitation is continued with the heat maintained for a period of about five to ten minutes or more at the end of which time the grains will be infinitely small so as to resemble the texture of smooth cream and the product will be of such a nature as to have special power as an emulsifier.

An alternative method of producing a product having a texture composed of infinitely small grains is as follows: The milk, which has been subjected to the caramelizing and hydrolyzing treatment, is allowed to drop to 140°–150° F. It is then continuously agitated over a period of from one to two hours, this temperature being maintained during this period. This process produces practically the same effect as does the calcium lactate. The principal advantage of the use of this chemical is that it shortens the time of the processing.

The milk emulsifier thus produced is employed for forming an emulsion with the bacon grease, the fried bacon and the cheese so as to produce a highly homogeneous product free from a fatty or oily appearance. The fried bacon mixture, including the fried bacon and grease therefrom, can be emulsified with the special milk emulsifier in the following manner:

The milk emulsifier, produced as above described, is transferred to a kettle containing a beater type of agitator and the hot bacon grease is added in small amounts at a time. After each addition the product is well stirred and beaten up in such a manner as to incorporate the bacon grease thoroughly in the milk emulsified. After all of the bacon grease has been added the fried bacon in a comminuted state is incorporated and the emulsion is given a final beating until the final product shows no trace of free oil. This emulsifying operation can be conducted in the cold but will be facilitated and hastened if the milk mixture is heated to around 150 to 160° F.

The emulsion thus produced contains the fried bacon and bacon fat intimately emulsified with the caramelized and hydrolyzed milk emulsifier and this product can be employed as a new food product. It can advantageously be employed for incorporating cheese therewith to form a new cheese product having a bacon flavor and containing the bacon and bacon fat so intimately incorporated that the product shows no trace of free oil.

In order to incorporate the cheese with the emulsion of bacon and milk emulsifier, this mixture, if not previously heated, should be brought to a temperature of about 150° F. either by live steam or by indirect heating with steam in a jacketed kettle. The cheese blend is slowly added to the hot emulsion of bacon and milk emulsifier with moderately slow stirring. After the resulting mixture has reached the required temperature of about 150 to 160° F. and is homogeneous throughout the product is transferred from the kettle and packaged in suitable containers such as tin foil lined cartons, by well known methods of packaging.

The composite product thus produced may contain varying proportions of cheese, milk emulsifier and fried bacon (including bacon fat). A valuable product is made up of about 20 to 30% milk emulsifier (i. e. caramelized and hydrolyzed milk produced as above described), about 15% of bacon (fried bacon and bacon fat), about 50 to 60% of the cheese mixture and about 5% of salt and water.

Such a product produced as above described is a valuable sandwich spread. It is a homogeneous blend of milk products and fried bacon so emulsified as to have a creamy texture such that it can be spread on bread or crackers in much the same manner as one would use butter. The product being of a homogeneous blend of a high quality, uniformly fried bacon (including bacon fat) and with cured cheese and specially treated milk, contains these ingredients so combined that all the bacon grease is incorporated in the product without showing traces of bacon fat.

The new product has a pleasing and distinctive flavor, being a blend of both cheese and bacon, and, when the homogenized and caramelized milk is used as emulsifier, having also the flavor of the milk emulsifier blending with that of the cheese and bacon.

The new product is produced directly in a homogeneous, emulsified condition, suitable for use as a sandwich spread and is also pasteurized during its process of manufacture, thus assuring to the consumer a pure, highly uniform, pasteurized food product. It is a highly nutritious food product containing a relatively high percentage of fats, proteins, carbohydrates and mineral constituents. The new product possesses a permanency which permits it to be packed in tin foil protected by paper cartons, without requiring the more expensive glass containers. While hot it is of a semi-fluid consistency such that it can be packaged with modern filling machines, thereby avoiding contact with human hands during its packaging and assuring a clean food product.

The new food product is not only a spread for sandwiches but is a highly nutritious food product for cooking. It is soluble in water to such an extent as to make it extremely desirable in the preparation of macaroni, escalloped potatoes, potatoes-au-gratin, toasted sandwiches, and like dishes.

The emulsified product made of bacon and milk emulsifier is also a valuable food product, but the new food product containing cheese and bacon emulsified therewith is particularly valuable.

Additional food ingredients can be incorporated with the new food product, such as relishes, consisting of pickles, pimento, chili sauce or other condiments, etc.

I do not claim herein the new milk emulsifier, nor do I claim herein broadly the combination thereof with cheese, inasmuch as these are claimed in my companion application Serial No. 271,650, but I claim herein the new food product containing fried bacon with cheese as well as the new food product comprising fried bacon and milk emulsifier, and the new food product containing the bacon fat emulsified with cheese by means of the new milk emulsifier.

I claim:

1. A new food product comprising cheese and fried bacon fat homogeneously emulsified and incorporated therewith.

2. A new food product comprising cheese and fried bacon, including bacon fat, emulsified together in the form of a homogeneous product.

3. A new food product comprising caramelized and hydrolyzed milk having fried bacon fat emulsified therewith to form a homogeneous mixture.

4. A new food product comprising caramelized and hydrolyzed milk having fried bacon, including bacon fat, emulsified therewith to form a homogeneous product.

5. A new food product comprising cheese, caramelized and hydrolyzed milk, and fried bacon fat emulsified together in the form of a homogeneous product.

6. A new food product comprising cheese, caramelized and hydrolyzed milk, comminuted fried bacon and bacon fat emulsified together to form a homogeneous product.

7. A new food product comprising about 50–60% cheese mixture, about 20–30% caramelized and hydrolyzed milk emulsifier, about 15% bacon and about 5% salt and water, emulsified together to form a homogeneous product.

8. A new food product comprising a blend of American cheese of different ages and comminuted fried bacon and bacon fat emulsified together to form a homogeneous cheese product having a bacon flavor.

9. A new food product comprising a blend of American cheese of different ages and comminuted fried bacon and bacon fat emulsified together to form a homogeneous cheese product having a bacon flavor, said product being emulsified with caramelized and hydrolyzed milk which imparts a modified flavor to the product.

10. A new food product comprising cheese having comminuted fried bacon and bacon fat emulsified therewith to form a homogeneous product, said product being of a suitable consistency to be packaged in a tin foil wrapper in a paper carton.

11. A new food product comprising cheese, comminuted fried bacon and bacon fat, and condiments, said product being emulsified in the form of a homogeneous product.

12. The method of making a new food product comprising cheese and fried bacon fat which comprises incorporating the fried bacon fat with the cheese with the aid of an emulsifier to form a homogeneous emulsion.

13. The method of making a new food product containing cheese and fried bacon fat which comprises emulsifying the fried bacon fat with a milk emulsifier made up of caramelized and hydrolyzed milk, and incorporating the cheese with such emulsion to form a homogeneous emulsified cheese product having a bacon flavor.

14. The method of making a new food product which comprises subjecting concentrated milk to a hydrolyzing and caramelizing treatment to form therefrom a milk emulsifier, incorporating fried bacon fat with such emulsifier to form a homogeneous emulsion, and incorporating cheese with such emulsion to form a homogeneous cheese product having a bacon flavor.

15. The method of making a new food product which comprises subjecting concentrated milk to a hydrolyzing and caramelizing treatment to form therefrom a milk emulsifier, and incorporating fried bacon fat with such emulsifier to form a homogeneous emulsion.

In testimony whereof I affix my signature.

CLINTON HENRY PARSONS.